United States Patent
Domergue et al.

(10) Patent No.: US 12,416,192 B2
(45) Date of Patent: Sep. 16, 2025

(54) PNEUMATIC RELEASE SYSTEM

(71) Applicant: Ratier-Figeac SAS, Figeac (FR)

(72) Inventors: Edmond Domergue, Almont les junies (FR); Raphael Plata, Cuzac (FR); Emmanuel Houradou, Cardaillac (FR)

(73) Assignee: RATIER-FIGEAC SAS, Figeac (FR)

( * ) Notice: Subject to any disclaimer, the term of this patent is extended or adjusted under 35 U.S.C. 154(b) by 0 days.

(21) Appl. No.: 17/898,879

(22) Filed: Aug. 30, 2022

(65) Prior Publication Data

US 2023/0062791 A1 Mar. 2, 2023

(30) Foreign Application Priority Data

Sep. 2, 2021 (EP) .................................. 21306202

(51) Int. Cl.
*E05F 15/72* (2015.01)
*E05F 15/50* (2015.01)

(52) U.S. Cl.
CPC .............. *E05F 15/50* (2015.01); *E05F 15/72* (2015.01); *E05Y 2201/422* (2013.01); *E05Y 2201/454* (2013.01); *E05Y 2201/456* (2013.01); *E05Y 2900/502* (2013.01); *E05Y 2900/531* (2013.01)

(58) Field of Classification Search
CPC .......... F15B 13/02; F15B 13/027; E05F 15/50
USPC .......................................................... 91/436
See application file for complete search history.

(56) References Cited

U.S. PATENT DOCUMENTS

| 2,730,269 | A | * | 1/1956 | Earle | G05D 16/10 |
| | | | | | 222/630 |
| 7,114,431 | B1 | | 10/2006 | Holder | |
| 7,401,751 | B2 | | 7/2008 | Holder | |
| 8,998,141 | B2 | * | 4/2015 | Bergonnier | B64C 1/1423 |
| | | | | | 244/99.2 |
| 2020/0393056 | A1 | | 12/2020 | Khare et al. | |
| 2021/0246706 | A1 | * | 8/2021 | Houradou | E05F 15/50 |

FOREIGN PATENT DOCUMENTS

DE 2155452 A1 5/1973

OTHER PUBLICATIONS

European Search Report for Application No. 21306202.9, mailed Feb. 28, 2022, 9 pages.

* cited by examiner

*Primary Examiner* — Nathaniel E Wiehe
*Assistant Examiner* — Daniel S Collins
(74) *Attorney, Agent, or Firm* — CANTOR COLBURN LLP

(57) ABSTRACT

A pneumatic release system has an inlet arranged to be connected, in use, to a supply of pressurised fluid, and an outlet arranged, to be connected, in use, to an end device. The system defines therethrough, a flow path for fluid from the inlet to the outlet. The system includes a piston mounted in and axially moveable relative to a cylinder, the inlet and outlet defined in the cylinder. The piston has a piston end on which are mounted upper and lower seals and is biased to a first closed position, in which the upper and lower seals define a chamber within the cylinder to retain pressurised fluid from the inlet, the upper seals preventing flow of the fluid from the chamber to the outlet, and wherein an external force applied to the piston moves the upper seals away from sealing engagement with the cylinder.

10 Claims, 1 Drawing Sheet

Initial state -
Before Actuation

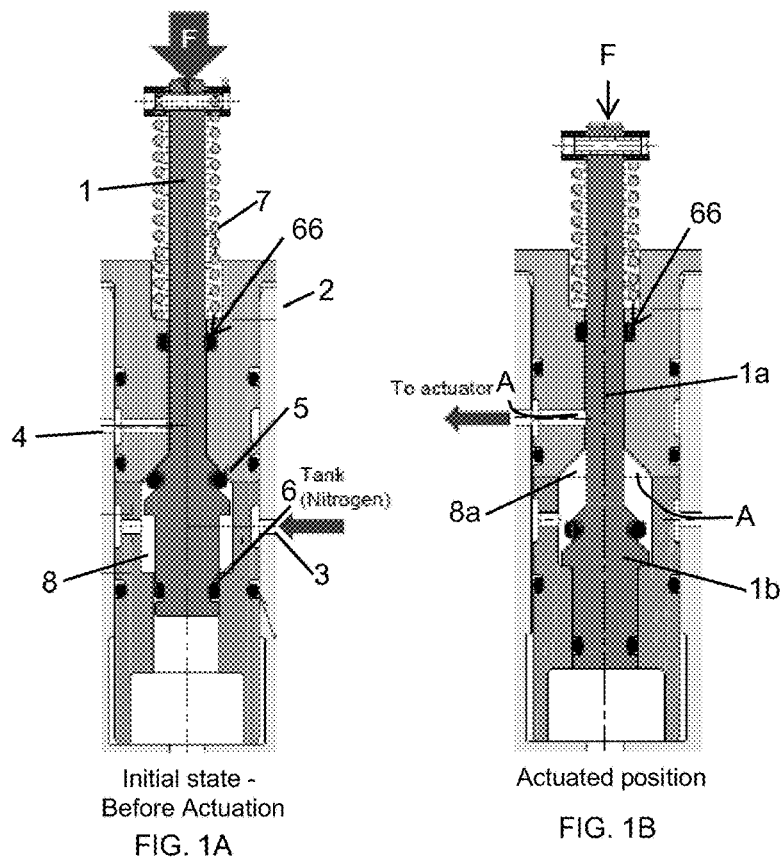
Initial state - Before Actuation
FIG. 1A
Actuated position
FIG. 1B
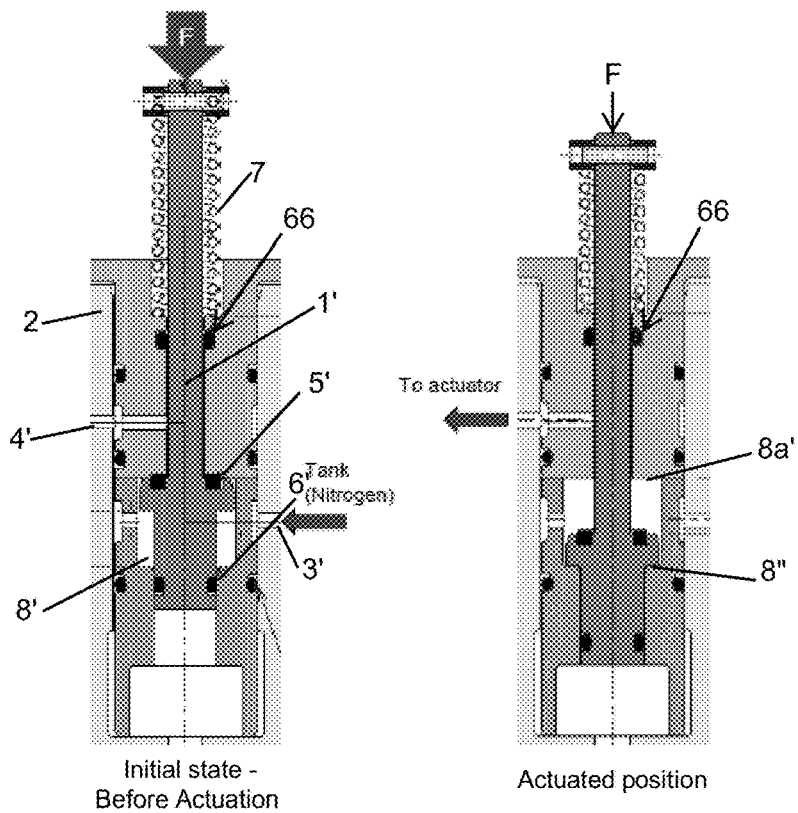
Initial state - Before Actuation
FIG. 2A
Actuated position
FIG. 2B

PNEUMATIC RELEASE SYSTEM

CROSS-REFERENCE TO RELATED APPLICATIONS

This application claims priority to European Patent Application No. 21306202.9 filed Sep. 2, 2021, the entire contents of which is incorporated herein by reference.

TECHNICAL FIELD

The present disclosure is concerned with a pneumatic release system for allowing the flow of a pressurised fluid to an actuator or the like.

BACKGROUND

There are many applications in which pressurised fluid is retained under pressure in a reservoir or tank until it is required to pneumatically drive a load using the stored energy from the fluid. In that case, fluid from the reservoir is required to be released and to flow to the load e.g. to an actuator or to an actuated device e.g. an inflatable device. Such pneumatic systems are used, for example, to actuate emergency evacuation systems such as doors or hatches or evacuation slides in aircraft or the like.

Many of these pneumatic systems release the pressurised fluid by puncturing a membrane or diaphragm at the reservoir or in the flow path from the reservoir to allow the fluid to flow from the reservoir via the punctured diaphragm. Mechanical, or sometimes electrical or manual or hydraulic devices can cause the puncturing of the diaphragm when the fluid is required to be released.

Because they require the diaphragm or membrane to be punctured, and, therefore, destroyed, such release systems are single-use and, after they have been deployed, the functional parts all need to be removed and replaced. In addition, the release system that causes the diaphragm to be punctured is often activated by e.g. breaking a shear pin or the like. As such devices are often only used in emergency release systems, replacement does not need to be performed frequently, but, nevertheless, it still involves time and labour and introduces the possibility of human error each time the parts have to be replaced. Also, although replacement of such parts is generally performed in a clean environment, there is still the possibility that dust and debris can enter the system during replacement.

There is, therefore, a desire for a pneumatic release system that does not require the destruction of functional parts for its operation, to avoid the need to remove and replace the parts after each use.

According to the present disclosure, there is provided a pneumatic release system having an inlet arranged to be connected, in use, to a supply of pressurised fluid, and an outlet arranged, to be connected, in use, to an end device, the system defining therethrough, a flow path for fluid from the inlet to the outlet, wherein the system comprises a piston mounted in and axially moveable relative to a cylinder, the inlet and outlet defined in the cylinder; the piston having a piston end on which are mounted upper and lower seals, wherein the piston is biased to a first closed position, in which the upper and lower seals define a chamber within the cylinder to retain pressurised fluid from the inlet, the upper seal preventing flow of the fluid from the chamber to the outlet, and wherein an external force applied to the piston moves the upper seal away from sealing engagement with the cylinder to allow fluid to flow from the chamber to the outlet.

According to another aspect there is provided a door damper and actuator system having such a pneumatic release system between a source of pressurised fluid and the door.

BRIEF DESCRIPTION

Examples of a system according to the disclosure will now be described, by way of example only, with reference to the drawings. Modifications of the described examples may also fall within the scope of the invention as defined by the claims.

FIG. 1A is a sectional view of a release system according to the disclosure, in an initial state.

FIG. 1B shows the system of FIG. 1A in an actuated position.

FIG. 2A is a sectional view of an alternative design, in an initial state.

FIG. 2B shows the system of FIG. 2A in an actuated position.

DETAILED DESCRIPTION

Referring to FIGS. 1A and 1B, the release system comprises a piston 1 mounted within, and axially moveable along, a cylinder 2. The cylinder 2 has an inlet 3 arranged for connection to a reservoir of pressurised fluid (not shown) e.g. a tank of pressurised nitrogen, and outlet 4 from which the fluid flows after being released from the reservoir. The outlet is arranged to be connected to the end device e.g. an actuator, not shown. A fluid flow path A-A is defined through the cylinder 2 from the inlet to the outlet. The piston 1 is provided with a piston shaft seal 66 and upper and lower seals 5, 6 arranged such that when the piston 1 is in a first, closed position (FIG. 1A) the seals prevent the flow of fluid from the inlet to the outlet via the fluid flow path. To release pressurised fluid from the reservoir through the system, the piston is displaced by application of a force F, relative to the cylinder 2, such that the seal 5 no longer closes the fluid flow path from the inlet to the outlet and fluid is therefore released from the pressurised reservoir and flows through the cylinder and out from the outlet to e.g. the actuator, as shown in FIG. 1B.

The piston 1 is biased in the first, closed position, (FIG. 1A), for example by means of a spring 7. Application of the force F to open the flowpath, as described above, causes compression of the spring 7 against the cylinder 2 (FIG. 1B). This ensures that the release system is stable in this first closed position and guarantees no inadvertent command of the door opening under accelerations, vibrations or the like. The piston can also be biased due to the contact force on the seals.

When the pressure in the flow path drops low enough e.g. when all of the fluid has been released from the reservoir, or when a counter-force is applied to the piston e.g. by manually pulling the piston upwards, the spring 7 expands again to bias the piston to the closed position thus resetting the release system. All that is then required for the release system to be ready for use again is for the reservoir to be refilled with pressurised fluid. In this closed position, the outlet is also closed, which can help prevent the door from closing again, as this will prevent gas from escaping the actuator chamber when it is stroking back, resulting in a pressure rise that prevents door movement.

The piston 1 and interior of the cylinder, as well as the location of the seals 5, 6 can be varied. In the example shown, the flow path is defined by a chamber 8 inside the cylinder 2 between the inlet 3 and the outlet 4, the chamber 8 having a tapered top part 8a. The piston 1 is formed as an elongate part 1a ending in a conical end part 1b, the conical part shaped to match the taper of the chamber top part 8a and the seal 5 located on the conical end part 1b of the piston seals against the chamber. The top part of the chamber 8a communicates with the outlet 4. When the piston is biased to its closed position (FIG. 1A), the seals and the conical end part of the piston seal the chamber off from the outlet thus preventing fluid flow from the chamber through the outlet. The lower seal 6 prevents flow from the bottom of the chamber. When the piston is pressed to the open or release position (FIG. 1B), the conical end part and the upper seal of the piston are pushed out of engagement with the tapered part of the chamber 8 thus opening the flow path from the chamber 8, which is in flow engagement with the inlet 3, to the outlet 4. The pressure of fluid in the chamber can hold the piston in the open position until the pressure falls below a threshold, at which time the piston returns to the initial position due to the spring bias.

The seals 5, 6, 66 are configured such that the pressure of the fluid in the chamber can hold the piston in the open position once it is opened but, if the piston is in the closed position it will not inadvertently be opened by the fluid pressure. This is due to the seals 5, 6 having an identical or very similar diameter. In this way, the fluid pressure is acting on two identical or almost identical surface areas so providing a balanced load on the piston while it is closed. The lower seal 6 could have a slightly smaller diameter than upper seal 5 because of the biasing force of the spring 7.

When the piston is in its initial state before the application of an external force, the contact force to prevent the piston moving to the open position is equal to the pressure multiplied by differential of the sections of seals 5 and 6 plus the bias force of the spring 7. The contact force to prevent opening can be set by the diameters of the upper and lower seals and/or by the spring force. The external force applied to the piston to open it must be high enough to counter that contact force.

While the piston is in the open position (as described above) the lower seal 6 and the small piston shaft seal 66 cooperate to keep the piston open until the fluid pressure falls below the threshold due to the diameter of the lower seal 6 being larger than that of the small piston shaft seal 66. Down to the threshold, the fluid pressure acting on the area of these seals, is such that the force of the spring 7 is exceeded, to keep the piston in the open position. In other words, the force keeping the piston open is equal to the pressure multiplied by the differential of the sections of seals 6 and 66 minus the spring force. The pressure level at which the piston starts to re-close can be set by the dimensions of the lower seal 6 and the piston shaft seal 66 alone and/or by the spring force.

For ease of explanation, friction has been ignored, but the skilled person will know to take friction into account when determining the forces in a real-life situation.

The system of this disclosure therefore has two stable positions. It can be manually activated, by the external force, to switch from the closed state to the open state and it then automatically resets to its closed state once the chamber pressure falls below the predetermined pressure (e.g. when the gas tank supplying the fluid is empty or almost empty). Thus, the system remains in a stable open state until all of the pressurised fluid e.g. gas in the supply tank, has escaped through the release system to actuate the load e.g. the door.

FIGS. 2A and 2B show an alternative design where the piston end part and the chamber have a rectangular shape rather than a conical shape. The principle of operation is, however, the same as described above with reference to FIGS. 1A and 1B. Here, in the closed position, the pressurised fluid from the inlet 3' is stored in the chamber 8' and held there by means of the upper and lower 5', 6' seals of the piston 1' and is prevented from flowing to the outlet 4'. When the force F is applied to the piston against the force of the spring 7, the upper seal 5' is pushed away from engagement with the chamber 8', thus allowing flow of the fluid from the chamber 8' to the outlet 4'. The distance between the upper and lower seals may be designed such that for a given spring force, the piston seats against the top 8a' of the chamber 8' when the spring 7 is relaxed. In the open position, when the chamber is full, the pressure of the fluid in the chamber 8' holds the piston against the bottom 8" of the chamber. When the pressure in the chamber 8 becomes less that the force of the spring 7, the end of the piston rises again through the chamber 8' and the upper seal engages again with the top of the chamber to seal off the outlet. The release system is then back in its initial position.

The release system of this disclosure may be e.g. part of an aircraft door release system. In the closed position of the release system, the system acts as a damper for the door system which is its normal mode of operation. In emergency situations where passengers need be evacuated as quickly as possible, flight attendants just need to actuate the release system via applying a force F to the release system piston, and the fluid flows to the door opening actuator forcing its fast and complete opening (not shown). The system of the disclosure may, however, have many other applications.

The fluid can be any pressurised fluid, but the system is particularly applicable for use with gases including e.g. air or nitrogen.

The system according to this disclosure avoids the problems of existing release systems discussed above. The functional parts of the system are not destroyed when deployed and so the system resets, after use, to be used again. This avoids the problems associated with having to replace the system parts after a single use.

The invention claimed is:

1. A pneumatic release system comprising:
   an inlet arranged to be connected, in use, to a supply of pressurised fluid;
   an outlet arranged, to be connected, in use, to an end device, the system defining therethrough, a flow path for fluid from the inlet to the outlet;
   a piston mounted in and axially moveable relative to a cylinder, the inlet and outlet defined in the cylinder, the piston having a piston body, a piston end, a piston seal provided around the piston body and upper and lower seals mounted at axially spaced locations to the piston end, wherein the upper seal and the lower seal have substantially same diameter, and wherein the piston seal has a smaller diameter than the upper and lower seals;
   wherein the piston is biased to a first closed position, in which the upper and lower seals define a chamber within the cylinder to retain pressurised fluid from the inlet, the chamber having a flat top part; the upper seal preventing flow of the fluid from the chamber to the outlet by contacting the flat top part of the chamber, and wherein an external force applied to the piston moves the piston to an open position with the upper seal away from sealing engagement with the flat top part of the cylinder to allow fluid to flow from the chamber to the outlet.

2. The system of claim 1, wherein the piston is biased to the first closed position by means of a spring and remains in the open position while the pressure of fluid in the chamber acting on the upper and lower seals causes the force of the spring to be exceeded, and when the pressure in the fluid chamber falls below a predetermined level, the spring force returns the piston to the closed position.

3. The system of claim 1, wherein the piston is biased to the first closed position by virtue of a contact force defined by the relative dimensions of the upper and lower seals.

4. The system of claim 1,
wherein the piston is formed as an elongate part ending in a flat end part shaped to match the chamber top part,
wherein the upper seal is located on the end part of the piston and seals against the chamber, and
wherein the top part of the chamber communicates with the outlet.

5. The system of claim 1, arranged to operate as a door release mechanism.

6. The system of claim 5, wherein the door release mechanism is arranged as an aircraft door release mechanism.

7. The system of claim 1, further comprising a source of the pressurised fluid.

8. The system of claim 7, wherein the fluid is nitrogen.

9. A door release system comprising:
an actuator attached to a door; and
a pneumatic release system as claimed in claim 1, wherein the outlet is fluidly connected to the actuator.

10. A method of releasing pressurised fluid from a fluid source to an end device to be actuated by the pressurised fluid, the method comprising:
connecting a pneumatic release system as claimed in claim 1 between the fluid source and the end device, and applying an external force to the piston to allow the fluid to flow from the source to the end device via the fluid path.

* * * * *